United States Patent [19]
Murakami et al.

[11] Patent Number: 6,036,378
[45] Date of Patent: *Mar. 14, 2000

[54] FOCAL PLANE SHUTTER UNIT HAVING THREE PLATES

[75] Inventors: Naoyuki Murakami, Kawasaki; Masaru Shida, Tokyo, both of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,034

[22] Filed: Jan. 23, 1997

[30] Foreign Application Priority Data

Jan. 25, 1996 [JP] Japan .................................. 8-010638
Jan. 25, 1996 [JP] Japan .................................. 8-010639

[51] Int. Cl.⁷ ................................................ G03B 9/40
[52] U.S. Cl. .................................. 396/486; 396/357
[58] Field of Search .................................. 396/357, 452, 396/456, 483, 484, 485, 486, 487, 488

[56] References Cited

U.S. PATENT DOCUMENTS 5,266,993   11/1993   Uematsu .................................. 396/486
5,623,711    4/1997   Misawa .................................... 396/357

*Primary Examiner*—Howard B. Blankenship

[57] ABSTRACT

A focal plane shutter unit includes two pairs of blade units consisting of a plurality of light shielding thin plates, a first plate having a first aperture, a second plate having a second aperture, disposed in a face-to-face relationship with the first plate, and having a part of a film passage path in a surface opposite to the surface on which the first plate is disposed, and a blade housing unit for housing the two pairs of blade units disposed in between the first plate and the second plate.

11 Claims, 8 Drawing Sheets

FOCAL PLANE SHUTTER UNIT HAVING THREE PLATES

BACKGROUND OF THE INVENTION

1. Field of the Invention

The present invention relates generally to a camera and more particularly to a focal plane shutter unit of the camera.

2. Related Background Art

FIG. 1 illustrates configurations of an earlier technological camera body and an earlier technological focal plane shutter unit. A shutter baseplate 1 has an aperture 1a. The numeral 2 designates a shutter mechanism portion. A cover plate 3 is formed with an aperture 3a. A leading curtain element 4 and a trailing curtain element 5 are disposed in between the shutter baseplate 1 and the cover plate 3. A shutter unit 6 comprises the shutter baseplate 1, the shutter mechanism portion 2, the cover plate 3, the leading curtain element 4 and the trailing curtain element 5. A camera body 7 has an aperture 7a for defining a photographic image plane. A film is, when photographed, regulated in terms of its position by two lengths of outside-of-film rails 7b provided in the camera body 7 with respect to the aperture 7a in up-and-down directions of the camera, which directions are orthogonal to a film advancing direction. Further, the film is set in a tunnel 8 formed of a difference in level between an inside-of-film rail 7c and the outside-of-film rail 7b, thereby regulating the position thereof in an optical-axis direction. Designated also by 7d is a film cartridge chamber, and 7e represents a spool chamber for winding the film.

FIG. 2 is also a vertical sectional view illustrating an earlier technological lens interchangeable type single-lens reflex camera. A mirror box 9 for housing a mirror for a finder optical system is fixed to the body 7 with screws 10a, 10b. A bayonet 11 having an interchangeable lens mounting fiducial surface 11a is fixed to the mirror box 9 with a screw 10c. A blade chamber 12 defined by the shutter baseplate 1 and the shutter cover plate 3 is disposed in between the mirror box 9 and the camera body 7, and is fixed to the mirror box 9 or the camera body 7.

In the above construction, the shutter is disposed in front of the aperture 7a formed in the camera body 7. Considering a shutter efficiency, however, it is preferable that a distance between a film surface and shutter blades be short. Hence, there is no alternative but to decrease a thickness of the cover plate 3. Accordingly, it is impossible to expect a high rigidity of the cover plate 3, and, if large in terms of a shutter charge power of a high-speed shutter, or if short of rigidity because of the shutter baseplate 1 being formed by plastic molding, a blade traveling space is narrowed due to the deformations of the cover plate 3 and of the shutter baseplate 1 as well. This results in such a problem as to exert an adverse influence on the shutter speed.

Further, according to the above construction, a focal plane in the camera is secured by controlling distances (rail-back dimensions) from the bayonet fiducial surface 11a to the inside-of-film rail 7c and the outside-of-film rail 7b. These distances are given by a sum of a thickness of the bayonet 11, a dimension from a bayonet fitting surface 9a to a body fitting surface 9b of the mirror box 9, and dimensions from a mirror box fitting surface 7f to the inside-of-film rail 7c and the outside-of-film rail 7b. If these parts are molded of plastic, as far as a single piece of part is concerned, the dimensions can be controlled with a high accuracy. The deformation is caused by attaching other parts such as an external cover, and it is therefore difficult to obtain the satisfactory rail-back dimensions. Therefore, the step hitherto taken is that the rail-back dimensions are controlled by cutting out the inside- and outside-of-film rails 7c, 7b by machining on the basis of the bayonet surface 11a after completing the assembly. This step might be, however, a factor of increasing the costs. Further, the camera body is fitted with a grip, a tripod mount, a suspension ring, etc. and thereby receives a large external force. This might consequently lead to a problem, wherein an error in the rail-back is produced because of the body 7 being deformed by applying the external force thereto in spite of the fact that the rail machining has been done.

SUMMARY OF THE INVENTION

It is a primary object of the present invention to enhance a strength of a baseplate constituting a shutter blade chamber and attain a high-accuracy shutter speed without reducing a shutter efficiency.

To accomplish the above object, according to one aspect of the present invention, a focal plane shutter unit comprises two pairs of blade units consisting of a plurality of light shielding thin plates, a first plate having a first aperture, a second plate having a second aperture, disposed in a face-to-face relationship with the first plate, and having a part of a film passage path in a surface opposite to the surface on which the first plate is disposed, and a blade housing unit for housing the two pairs of blade units disposed in between the first plate and the second plate.

With the construction given above, it is feasible to actualize the shutter unit exhibiting a remarkably increased rigidity while the shutter efficiency remains as it has hitherto been.

It is another object of the present invention to secure dimensions of a film focus plane without any rail working and attain such a construction as to cause no variation in dimensions of the film focus plane even when a large external force is applied to a camera body.

To accomplish the object given above, according to another aspect of the present invention, a camera comprises a camera body having a film cartridge chamber and a film winding chamber, and a camera sub-body constructed as a separate unit from the camera body, disposed in between the film cartridge chamber and the film winding chamber, and having an aperture for regulating an exposure image plane and a regulation member, disposed in the vicinity of the aperture, for regulating a film focus plane.

The camera sub-body further has a cover member for covering the regulation member, forming a gap through which a film is allowed to pass above the regulation member, and film in-and-out ports communicating with the film cartridge chamber and the film winding chamber at both ends thereof in a film passage direction.

The camera sub-body having the regulation member for regulating the film focus plane is separated from the camera body, and, therefore, even when the large external force is applied to the camera body, neither a deformation of the regulation member nor a deviation of the film focus plane is caused.

Since the cover member for covering the regulation member is unitized as a part of the camera sub-body, a high assembly efficiency is obtained.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
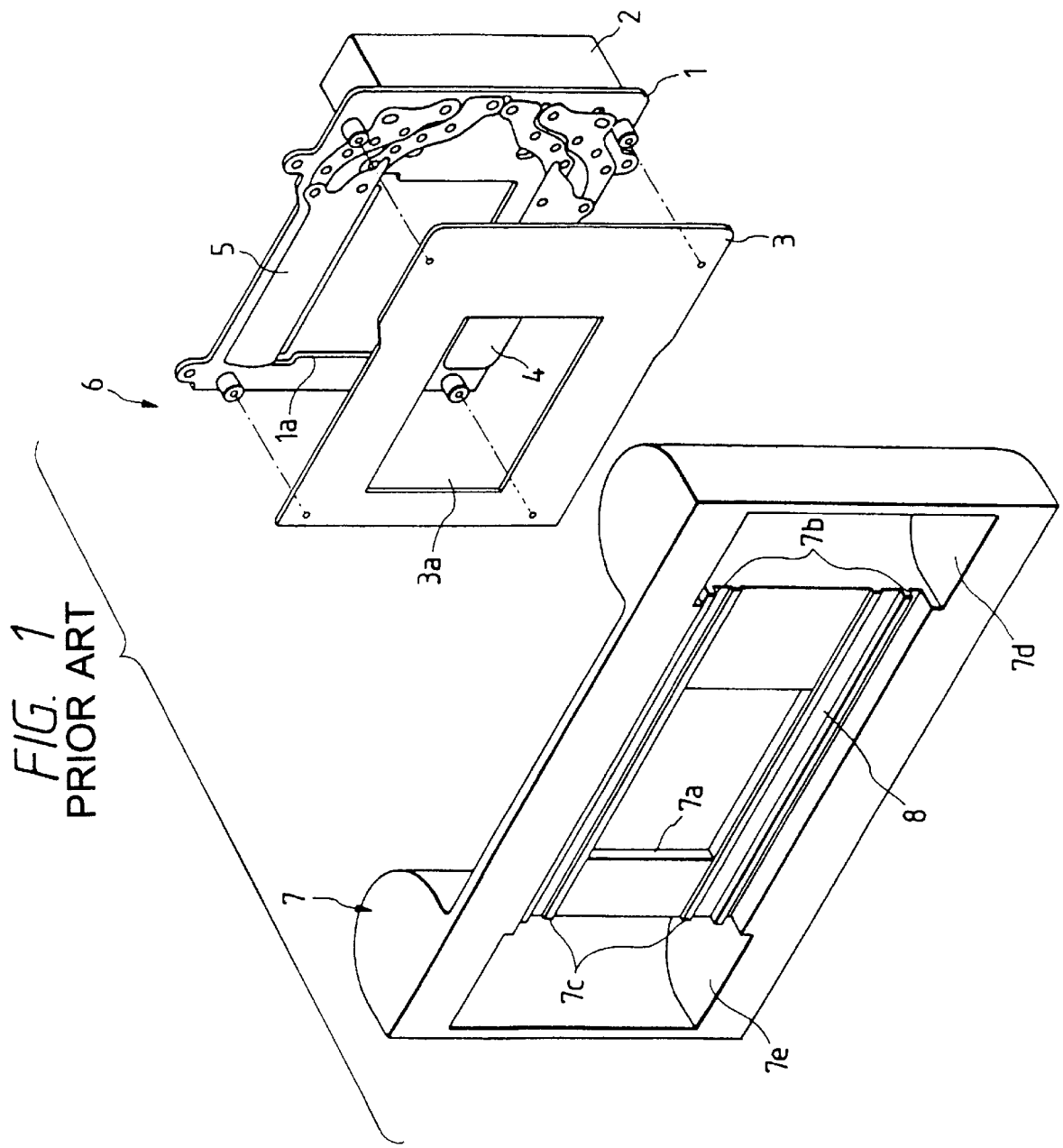
FIG. 1 is a perspective view illustrating an earlier technological example.
Figure 2:
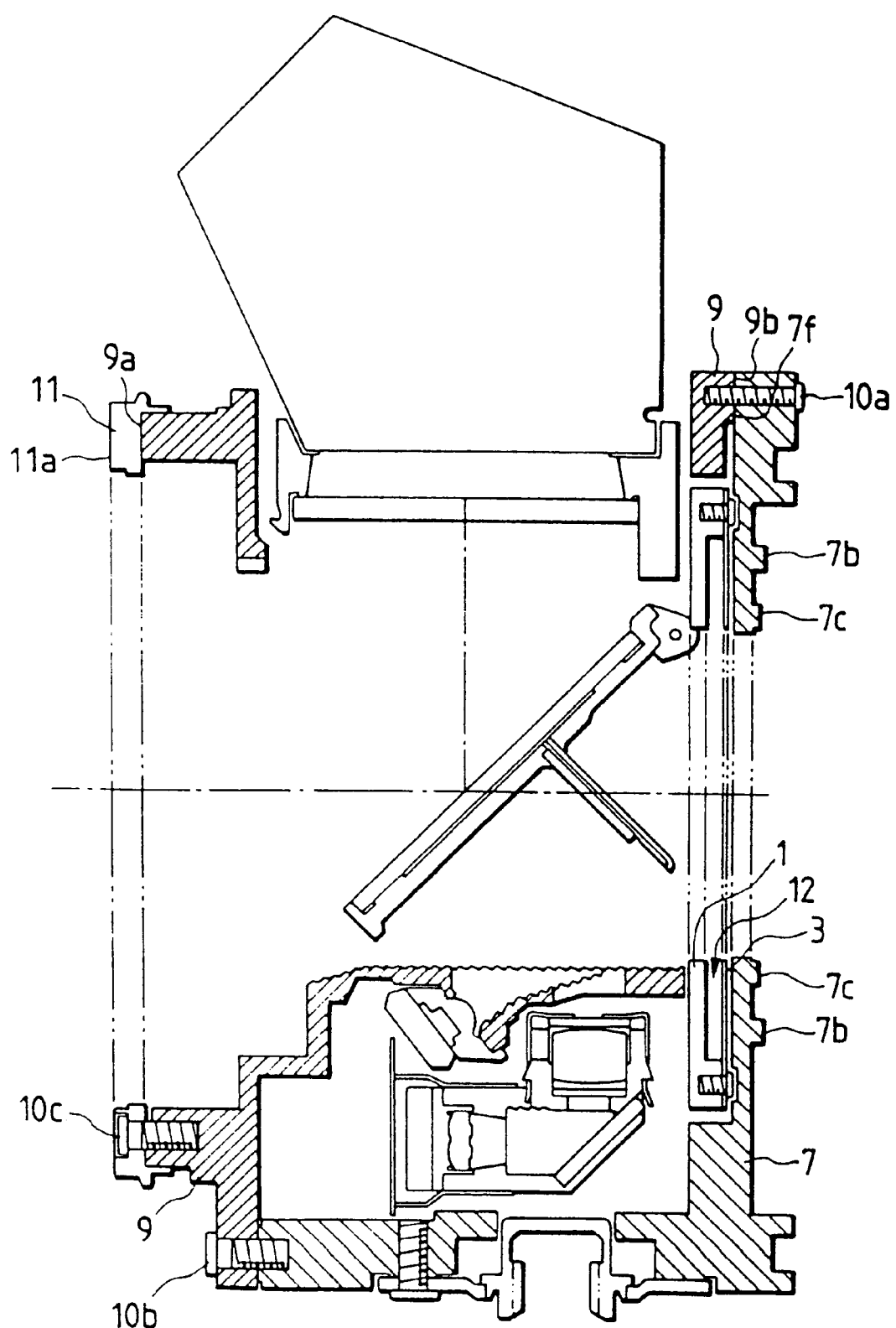
FIG. 2 is a vertical sectional view showing the earlier technological example.
Figure 3:
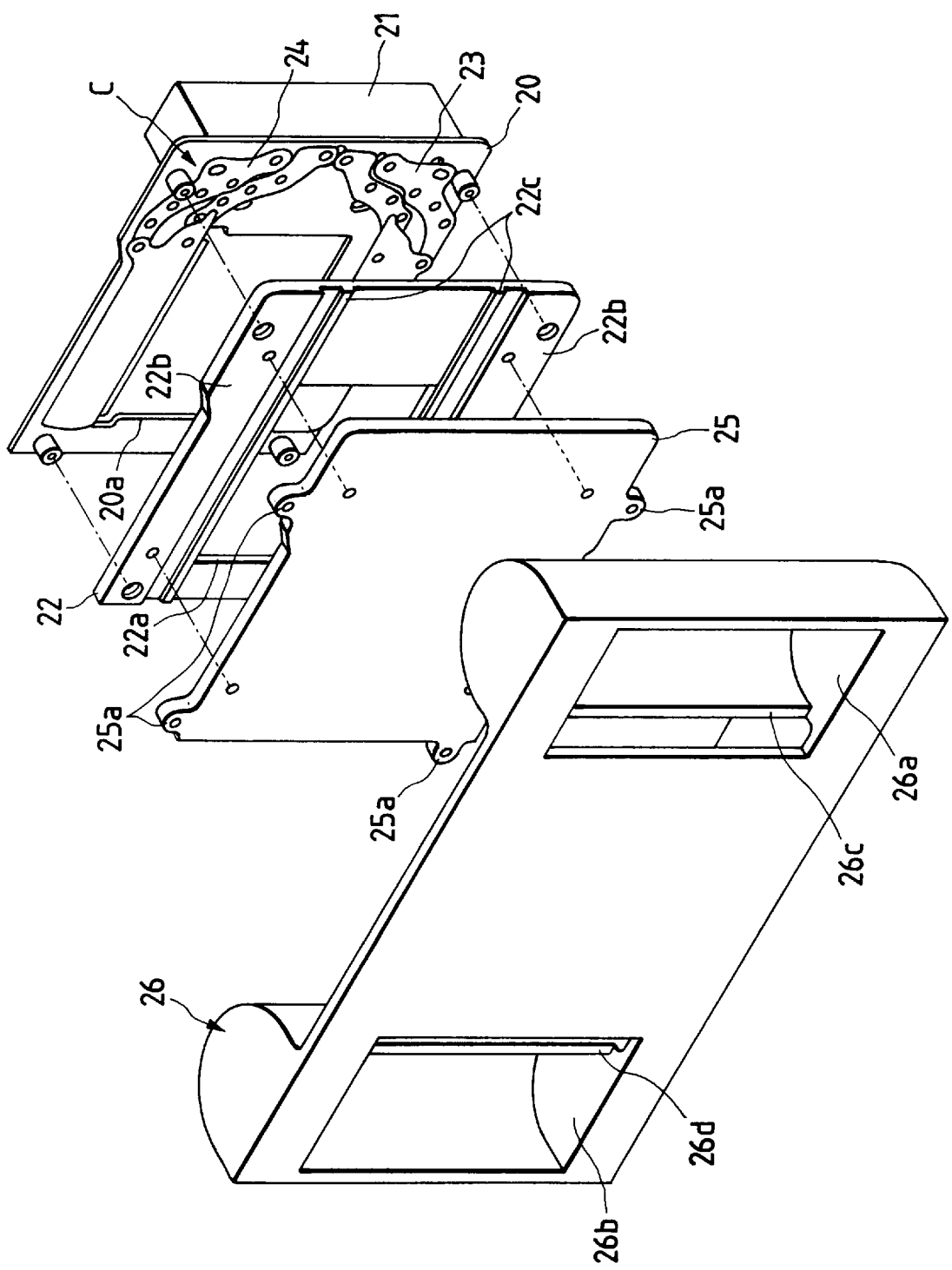
FIG. 3 is a perspective view showing a construction in accordance with a first embodiment of the present invention.
Figure 4:
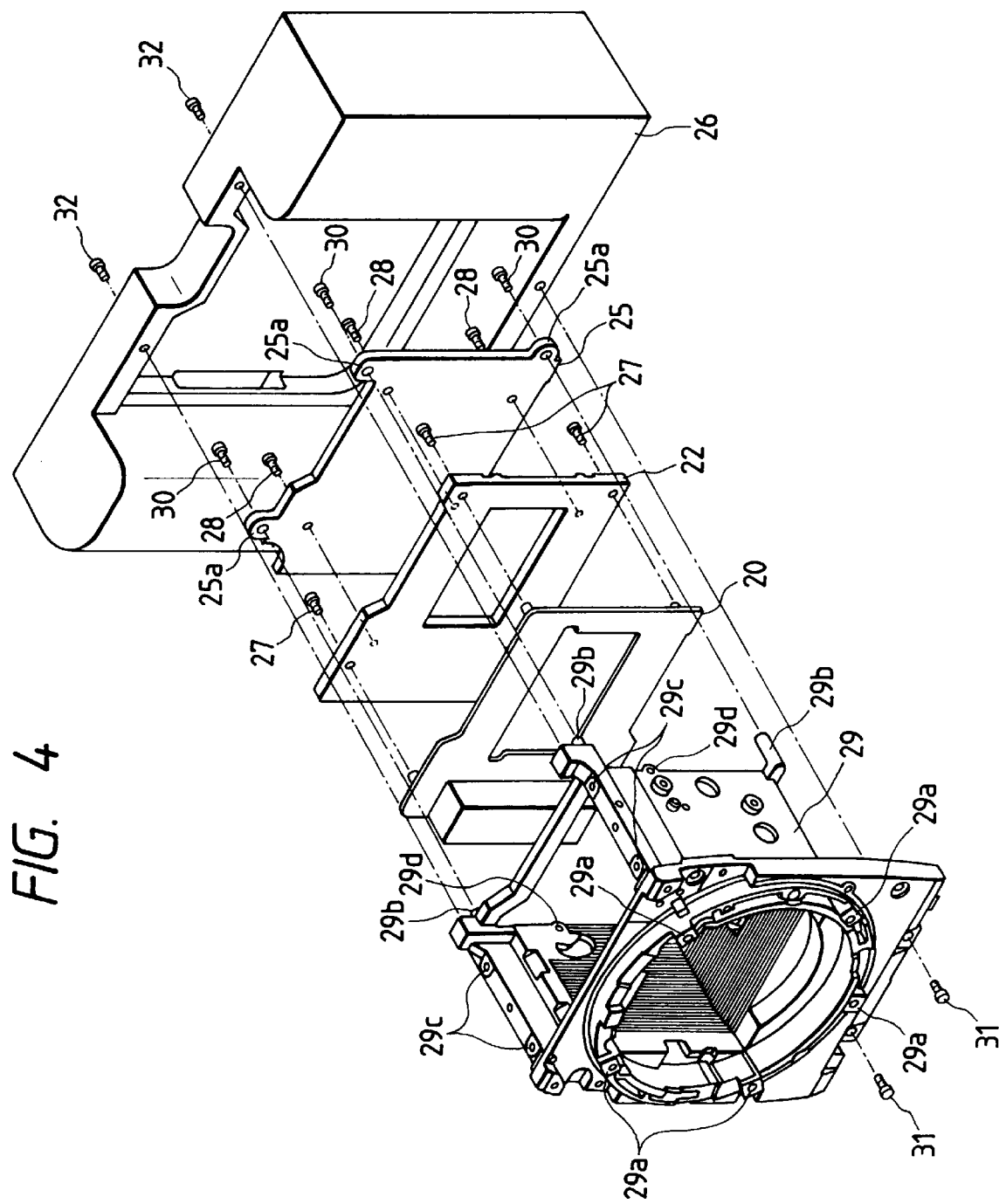
FIG. 4 is a perspective view illustrating the construction in accordance with the first embodiment of the present invention.

FIGS. 3 and 4 are perspective views each illustrating a construction in accordance with a first embodiment of the present invention.

Referring to FIG. 3, a shutter baseplate (a first plate) 20 is formed with an aperture 20a. Designated by 21 is a shutter mechanism portion provided on the shutter baseplate 20. A shutter cover plate (a second plate) 22 having an aperture 22a is disposed in a face-to-face relationship with the shutter baseplate 20, and a shutter blade chamber C is formed between the shutter baseplate 20 and the shutter cover plate 22. The aperture 22a is set smaller than the aperture 20a, and the photographic image plane is defined by the aperture 22a. The shutter blade chamber C accommodates blade units 23, 24 each consisting of a plurality of light-shielding thin plates. The blade units 23, 24 are driven by the shutter mechanism portion 21 and operate to open and close the aperture 22a. The shutter baseplate 20 is joined to the shutter cover plate 22 in such a position as to steer clear of a movable range of the blade units 23, 24. A film tunnel rear plate (a cover portion) 25 is disposed in a position facing to the surface, opposite to the blade chamber, of the shutter cover plate 22, and is attached in such a state as to be closely fitted to a surface 22b of the shutter cover plate 22. The shutter cover plate 22 is provided with two lengths of inside-of-film rails (regulation members) 22c with a height set lower than the surface 22b, and a film passage path is formed in a space between the film tunnel rear plate (a third plate) 25 and the inside-of-film rail 22c. The shutter cover plate 22 is joined to the film tunnel rear plate 25 at the surface 22b in such a position as to steer clear of the film passage path. A camera body designated by 26 is formed with a film cartridge chamber 26a and a film winding chamber 26b.

According to the above configuration, an increased thickness of the shutter cover plate 22 is attainable while the shutter efficiency remains as it has hitherto been, and hence a rigidity of the shutter blade chamber increases. Then, even when the shutter baseplate 20 is molded of plastic, and even if a quantity of the shutter charge force in the high-speed shutter is larger, the deformation of the blade chamber becomes smaller than in the earlier technology, and the precise shutter speed can be actualized. Further, when the film tunnel rear plate 25 is fixed to the shutter cover plate 22, the rigidity of the shutter cover plate 22 can be increased. In this case, the thickness of the shutter cover plate 22 is reduced, and the distance between the film surface and the shutter blades can be made shorter than in the earlier technology, and the shutter efficiency can be also enhanced. Moreover, when the shutter cover plate 22 is molded of plastic, the shutter cover plate 22 can be molded integrally with a wall for shielding the periphery of the blade chamber from the light and a drive shaft for supporting the shutter blade unit. This makes it possible to reduce the costs.

Referring to FIG. 4, the shutter cover plate 22 is fixed to the shutter baseplate 20 with a screw 27, while the tunnel rear plate 25 is fixed to the shutter cover plate 22 with a screw 28, thus forming a shutter unit including the film tunnel. A mirror box 29 houses a mirror for a finder optical system. The mirror box 29 includes bayonet mounting members 29a having an interchangeable lens mounting fiducial surface, mounting members 29b for the film tunnel rear plate 25, mounting members 29c for a prism box incorporating a penta prism and a photographed image observation screen, and mounting holes 29d for a rotary shaft of the finder optical system mirror. The film tunnel rear plate 25 has mounting members 25a with respect to the mirror box 29, and is fixed to the mirror box 29 with screws 30. That is, the film tunnel is so constructed as to be unitized with the mirror box. The mirror box 29 is fixed to the camera body with screws 31, 32.

Figure 5:
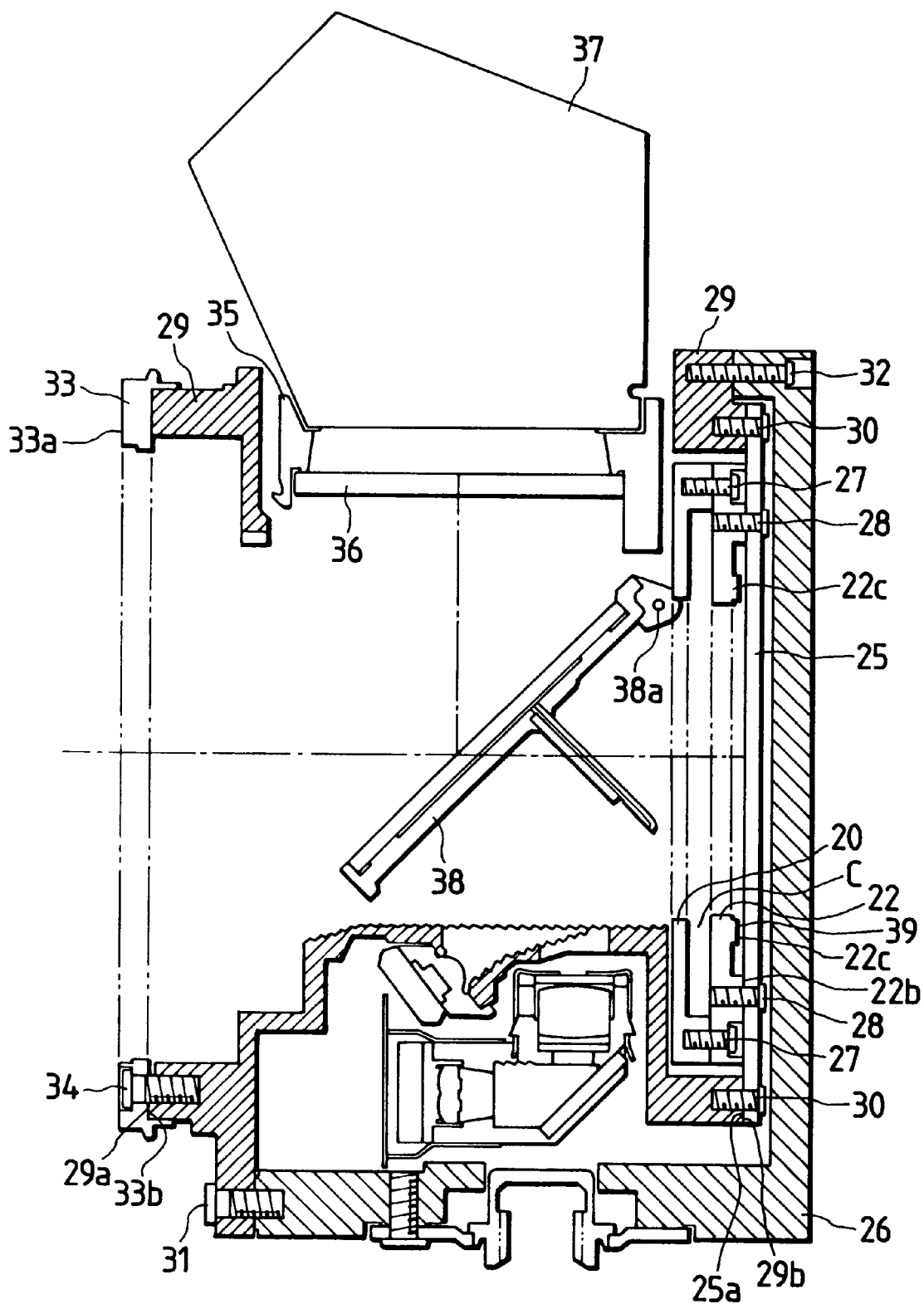
FIG. 5 is a vertical sectional view illustrating the construction in accordance with the first embodiment of the present invention.

FIG. 5 is a vertical sectional view showing a construction in accordance with the first embodiment of the present invention. A bayonet 33 having an interchangeable lens mounting fiducial surface 33a is fixed to the mirror box 29 by use of a screw 34. A prism box 35 has a photographed image observation screen 36 and a penta prism 37, and is fixed to the mounting members 29c provided in the mirror box 29. A finder optical system mirror 38 is rotatable with respect to a hole 38a, and is retained in the mirror box 29 so that the hole 38a is coaxial with the hole 29d formed in the mirror box 29. A photographic film is housed in a tunnel portion 39 formed in between the film tunnel rear plate 25 and the inside-of-film rail 22c provided on the shutter cover plate 22, and is regulated in terms of its position in an optical-axis direction. According to the construction in this embodiment, it follows that the rail-back dimension which is defined as the distance from the lens mounting fiducial surface to the inside-of-film rail 22c, is a sum of a dimension from the lens mounting surface 33a of the bayonet 33 to the mounting surface 33b with respect to the mirror box 29, a dimension from the bayonet fitting surface 29a of the mirror box 29 to the film tunnel rear plate fitting surface 29b thereof, and a dimension from the mirror box fitting surface 25a of the film tunnel rear plate 25 to the inside-of-film rail 22c, i.e., a dimension from the film tunnel rear plate fitting surface 22b of the shutter cover plate 22 to the inside-of-film rail 22c.

The above-described construction eliminates such a possibility that the film rail surface might be deformed due to attaching other parts such as an external cover, etc., and makes it feasible to secure the rail-back dimension without any secondary working if the dimensions of the bayonet 33, the mirror box 29 and the shutter cover plate 22 are controlled at a high accuracy. Further, even if a large external force is applied to the camera body 26 from the grip, the tripod mount and the suspension ring, the film surface in close vicinity of the photographic image plane is separated from the camera body 26, and the rail-back dimension does not change at all. Besides, it is of no importance that the camera body 26 is smaller in rigidity than in the earlier technology, and the camera body hitherto formed by hardware insert to increase the strength thereof, may be formed of only plastic and reduced in thickness. Also, downsizing of the camera body can be attained.

Figure 6:
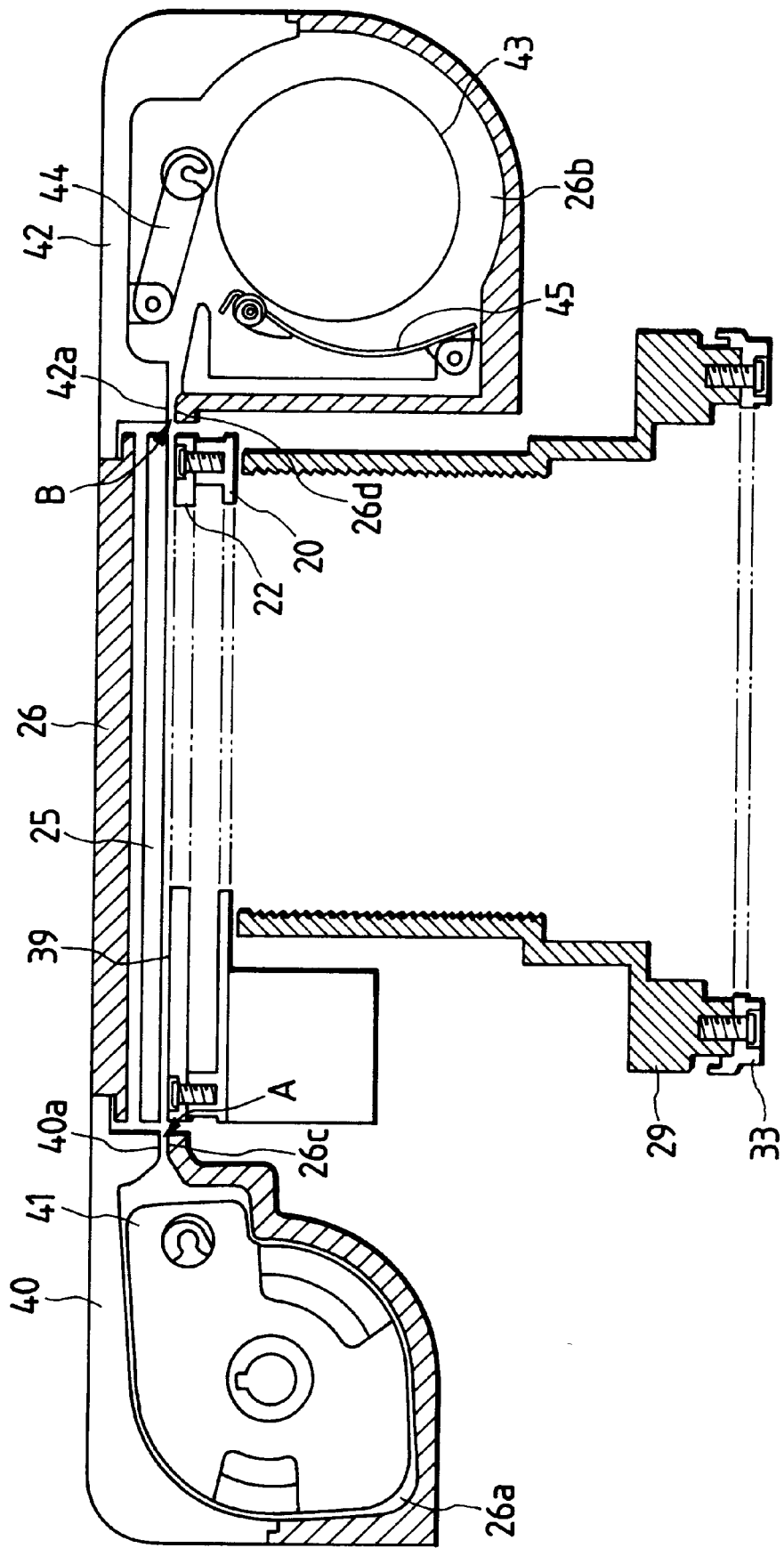
FIG. 6 is a cross-sectional view showing the construction in accordance with the first embodiment of the present invention.

FIG. 6 is a cross-sectional view showing the construction in accordance with the first embodiment of the present invention. A cartridge chamber cover member 40 for covering an optical-axis directional rear side of the film cartridge chamber 26a provided in the camera body 26, is formed with a film in-and-out port A in a position corresponding to the film tunnel 39, this port A being defined by a portion 26c provided in the camera body 26 and by a portion 40a provided on the cartridge chamber cover plate 40. The numeral 41 represents a film cartridge. A winding chamber cover member 42 for covering an optical-axis directional rear side of a film winding chamber 26b provided in the camera body 26, is formed with a film in-and-out port B in a position corresponding to the film tunnel 39, this port B being defined by a portion 26d provided on the camera body 26 and by a portion 42a provided on the winding chamber cover member 42. The film winding chamber 26b houses a film winding spool 43 and film rollers 44, 45. The film advanced out of the film cartridge 41 passes via the film in-and-out port A defined by the portions 26c, 40a and passes through the film tunnel 39 defined by the shutter cover plate 22 and by the film tunnel rear plate 25. Then, the film enters the film winding chamber 26b via the film in-and-out port B defined by the portions 26d, 42a, and is wound by the film winding spool 43, thus completing film loading into the camera. That is, it follows that the film is held by the camera body unit in the cartridge chamber 26a and the winding chamber 26b and is held in the mirror box unit in the vicinity of the exposure image plane.

Figure 7:
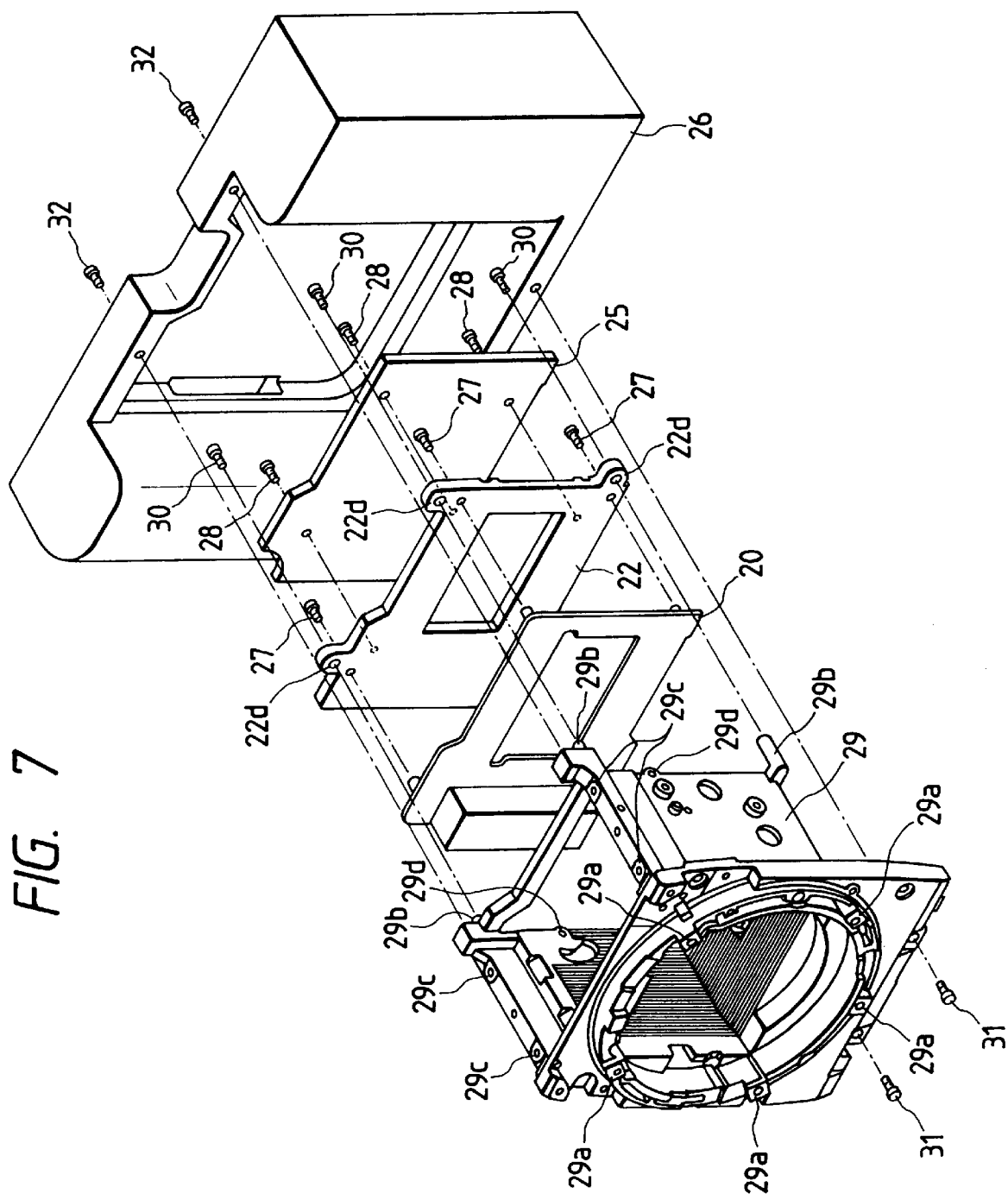
FIG. 7 is a perspective view illustrating a construction in accordance with a second embodiment of the present invention.

FIG. 7 is a perspective view illustrating a second embodiment of the present invention.

In accordance with the embodiment shown in FIG. 7, the shutter cover plate 22 is formed with a fitting surface 22d with respect to the camera. With even this configuration, a high rigidity of the shutter blade chamber C is obtained, and an enhancement in terms of accuracy of the shutter speed can be also expected. Further, the dimension from the fitting surface 22d to the inside-of-film rail surface 22c is controlled at a high accuracy, whereby the rail-back dimension can be secured without the secondary working. This also eliminates the possibility that the rail surface might be deformed by the external force.

Figure 8:
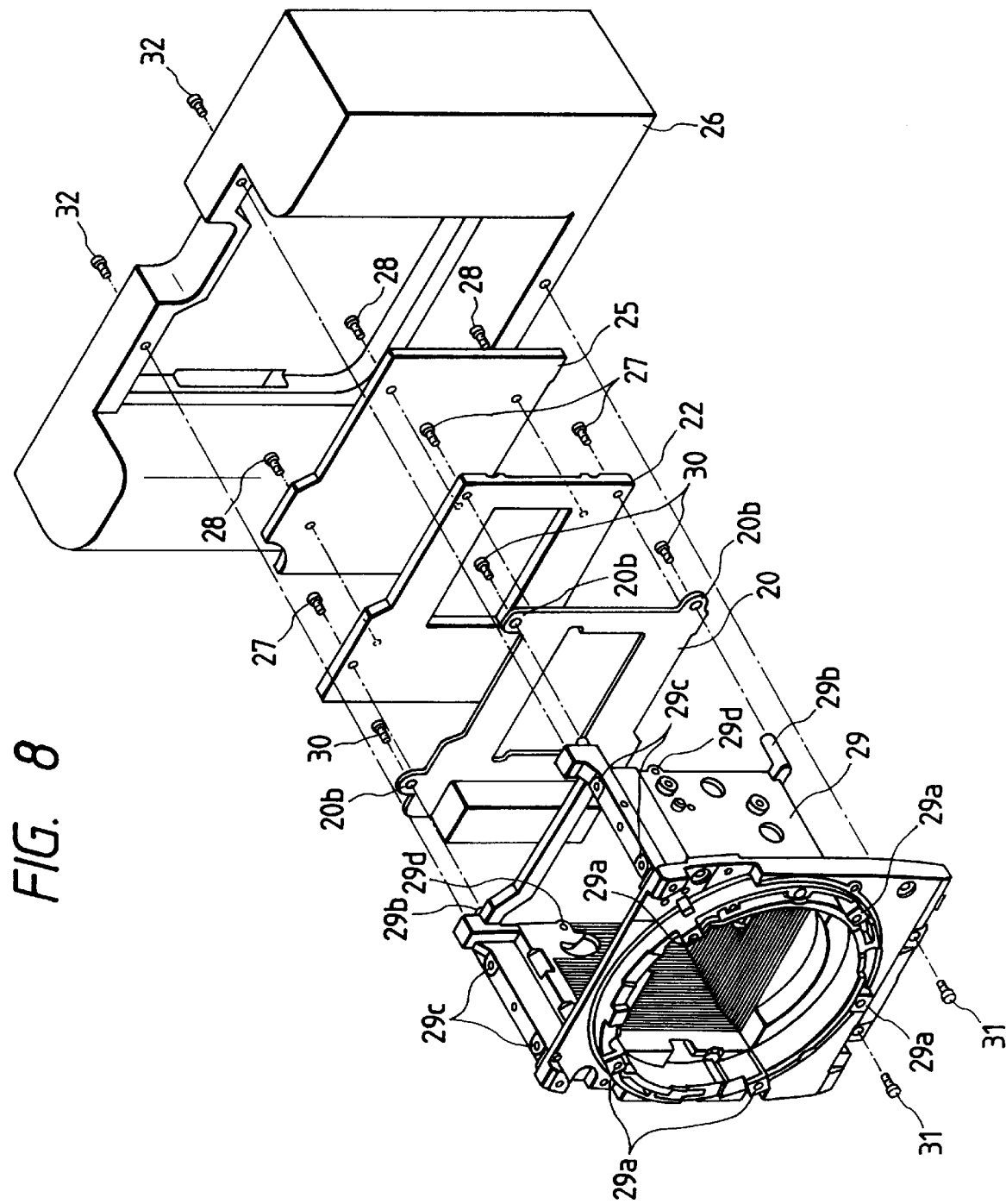
FIG. 8 is a perspective view illustrating another embodiment of the present invention.

In accordance with an embodiment shown in FIG. 8, the shutter baseplate 20 is provided with the fitting surface 20b with respect to the camera. With even this configuration, the high rigidity of the shutter blade chamber C can be obtained, and the enhancement in terms of the accuracy of the shutter speed can be expected. Also, this eliminates the possibility in which the rail surface might be deformed by the external force.

As discussed above, the film rail plate is separated from the camera body and is unitized as the shutter cover plate with the shutter, and therefore a large increase in the rigidity of the shutter cover plate can be expected while the shutter efficiency remains unchanged as it has hitherto been. Also, the high-accuracy shutter speed is attainable. Moreover, even when the large external force is applied to the camera body, because of the shutter being separated from the camera body, there is no possibility that the shutter speed accuracy is worsened due to the deformation of the shutter cover plate.

Further, in the case of the camera using a film cartridge incorporating a film advancing function, the shutter cover plate serving as the film rail plate, is attached to the tunnel rear plate for covering the rear side in the optical-axis direction of the photographic film, and the components up to the film tunnel can be constructed as the shutter unit. A further increase in the rigidity of the shutter cover plate can be thereby expected.

According to the present invention, since the second plate separated from the camera body is provided, the shutter unit with considerably increased rigidity can be attained while the shutter efficiency remains unchanged.

Furthermore, the rail-back dimension in the construction shown in FIG. 7 is the sum of the thickness dimension of the bayonet 33, the dimension from the bayonet fitting surface 29a of the mirror box 29 to the shutter cover plate fitting surface, and the dimension from the mirror box mounting member 22d of the shutter cover plate 22 to the inside-of-film rail 22c thereof. There must be no possibility that the shutter cover plate 22 is deformed due to attaching other parts to it, such as the external cover, etc., and hence the rail-back dimension can be secured without any secondary working by controlling the dimensions of the respective parts. Moreover, the shutter cover plate 22 is separated from the camera body 26, and, therefore, even when an external force is applied to the camera body 26 from the grip, the tripod mount and the suspension ring, the rail-back dimension is not varied at all. Further, according to the construction in this embodiment, the film tunnel rear plate 25 is provided on the side of the camera body 26 and closely fitted to the surface 22b of the shutter cover plate 22 with a spring property, thus forming the film tunnel. With this construction, the advantages mentioned above can be also obtained.

The film rail plate member hitherto provided in the camera body is separated from the camera body, and is unitized with the mirror box. With this configuration, there is eliminated the possibility in which the film rail plate is deformed due to attaching other parts such as the external cover, etc., and the rail-back dimension can be secured by controlling the dimensions of the related parts. The rail surface working step after completing the camera assembly can be abandoned, and a large reduction in the costs can be expected.

Further, the film tunnel is separated from the camera body, and hence, even when the large external force is applied to the camera body from the grip member, the tripod mount and the suspension ring, the film rail surface is not deformed at all, with the result that the stable rail-back dimension can be obtained.

As discussed above, according to the present invention, since the camera sub-body including the regulating member for regulating the film focus plane is separated from the camera body, even when a large external force is applied to the camera body, neither the deformation of the regulating member nor the deviation of the film focus plane is caused.

The cover member for covering the regulating member is also unitized as a unit component with the camera sub-body, and therefore good assembly efficiency is obtained.

It is apparent that, in this invention, a wide range of different working modes can be formed based on the invention without deviating from the spirit and scope of the invention. This invention is not restricted by its specific working modes except being limited by the appended claims.

What is claimed is:

1. A focal plane shutter unit comprising:

two pairs of blade units consisting of a plurality of light shielding thin plates;

a first plate having a first aperture;

a second plate having a second aperture, disposed in a face-to-face relationship with said first plate, and having a part of a film passage path in a surface opposite to the surface on which said first plate is disposed;

a blade housing unit to house said two pairs of blade units, disposed in between said first plate and said second plate; and a third plate, joined to said second plate in a face-to-face relationship with the surface of said second plate opposite the surface opposed to said first plate, to cooperate with said second plate to form said film passage path between said second plate and said third plate and to increase a rigidity of said second plate.

2. The focal plane shutter unit according to claim 1, wherein said second plate or said third plate has a mounting member to mount to said camera.

3. The focal plane shutter unit according to claim 1, wherein said first plate or said second plate further has a wall member for light-shielding at least a part of periphery of said blade housing unit.

4. A focal plane shutter unit comprising:

two pairs of blade units consisting of a plurality of light shielding thin plates;

a first plate having a first aperture;

a second plate having a second aperture and a mounting member to mount to a camera, disposed in a face-to-face relationship with said first plate so that a blade housing unit to house said two pairs of blade units, is formed between said first plate and said second plate, and having a part of a film passage path in a surface opposite to said blade housing unit; and a third plate, joined to said second plate in a face-to-face relationship with the surface of said second plate opposite the surface opposed to said first plate, to cooperate with said second plate to form said film passage path between said second plate and said third plate and to increase a rigidity of said second plate.

5. The focal plane shutter unit according to claim 4, wherein said second plate further has a wall member for light-shielding at least a part of periphery of said blade housing unit.

6. A camera comprising:

a camera body having a film cartridge chamber and a film winding chamber;

a camera sub-body constructed as a separate unit from said camera body, disposed in between said film cartridge chamber and said film winding chamber, and having an aperture for regulating an exposure image plane and having a part of a film passage path disposed in the vicinity of said aperture; and a plate, fixed to said camera sub-body to be disposed between said camera body and said camera sub-body to cooperate with said part of said film passage path of said camera sub-body to form said film passage path between said plate and said camera sub-body and between said camera sub-body and said camera body.

7. The camera according to claim 6, wherein said camera sub-body further has:

a cover member for covering said part of said film passage path to form a gap through which a film is allowed to pass above said part of said film passage path; and film in-and-out ports communicating respectively with said film cartridge chamber and said film winding chamber at both ends of said camera sub-body in a film passage direction.

8. The camera according to claim 6, wherein said camera sub-body further has a photographic lens mounting fiducial member.

9. A shutter unit comprising:

first and second paints of blade units having a plurality of light shielding thin plates;

a first plate having a first aperture;

a second plate having a second aperture, disposed facing said first plate and having a film path on a surface opposite said first plate, said first and second plates forming a shutter blade chamber for said first and second pairs of blade units; and a third plate, joined to said second plate in a face-to-face relationship with the surface of said second plate opposite the surface opposed to said first plate, to cooperate with said second plate to form said film path between said second plate and said third plate and to increase a rigidity of said second plate.

10. A camera comprising:

a camera body having a film chamber;

a camera sub-body formed as a separate unit from said camera body and disposed adjacent said film chamber, said camera sub-body having an aperture and a film path arranged adjacent said aperture; and a plate, fixed to said camera sub-body to be disposed between said camera body and said camera sub-body, to cooperate with said camera sub-body to form said film path between said plate and said camera sub-body and between said camera sub-body and said camera body.

11. A camera according to claim 10, wherein said camera sub-body further comprises:

a cover member to cover the film path so as to form a gap through which film can pass above the film path; and a port communicating with said film chamber.

* * * * *